Figure 1:
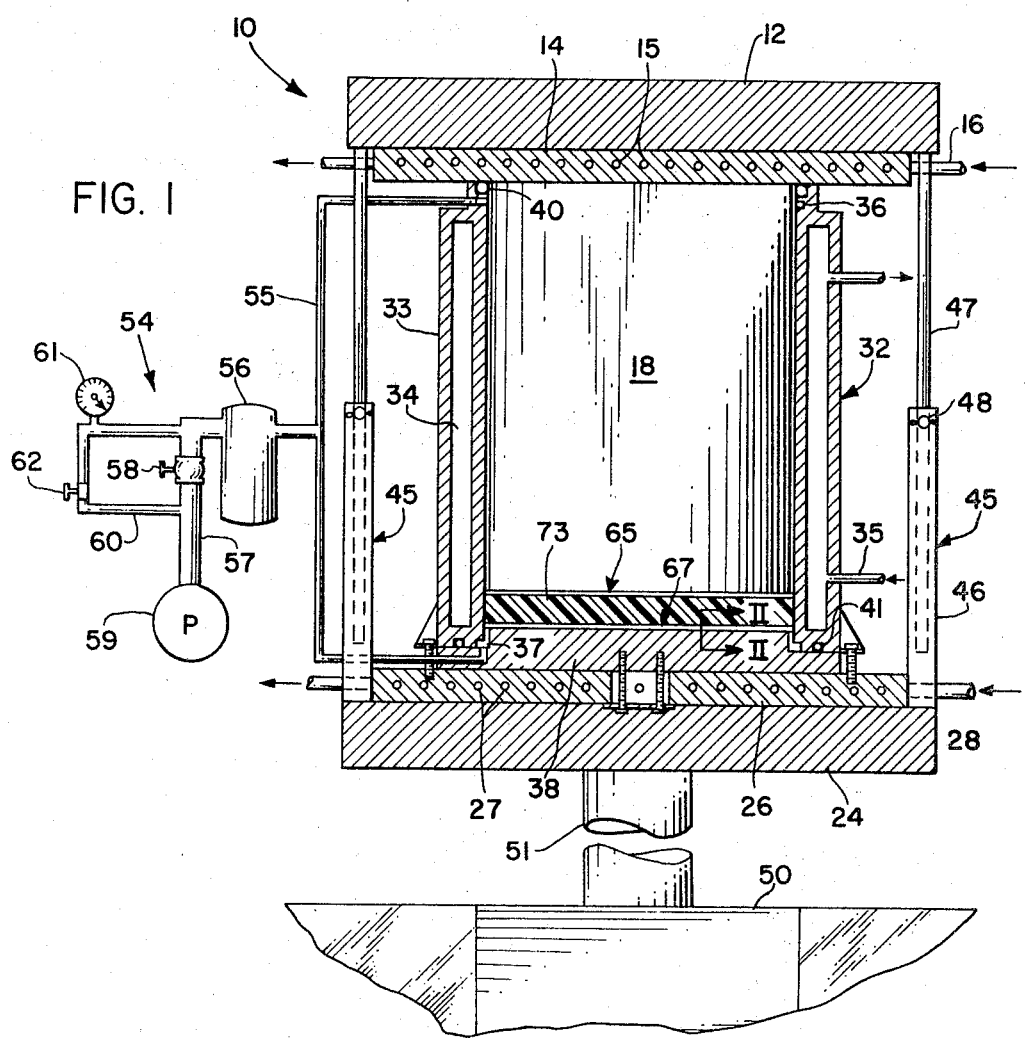

May 2, 1967 W. C. HEIER 3,317,641

METHOD FOR MOLDING COMPOUNDS

Filed March 11, 1964

INVENTOR
WILBUR C. HEIER

BY

ATTORNEYS

3,317,641
METHOD FOR MOLDING COMPOUNDS

Wilbur C. Heier, Hampton, Va., assignor to the United States of America as represented by the Administrator of the National Aeronautics and Space Administration
Filed Mar. 11, 1964, Ser. No. 351,259
3 Claims. (Cl. 264—102)

The invention described herein may be manufactured and used by or for the Government of the United States of America for governmental purposes without the payment of any royalties thereon or therefor.

This invention relates to a method for compression molding a thermosetting compound, and more particularly to a method for molding low or high density ablation materials of microparticle size and high bulk factor, resulting in a homogenous stres-free part.

Attempts have been made to mold thermosetting material with a high bulk factor by straight compression molding. Although this technique is to a degree satisfactory, generally a finished billet does not result which will meet the specifications of many materials now required. One such material is ablation material for the nose of space reentry vehicles. Generally, the billet which is the product of a straight compression mold contains cracks, particularly if the billet is of substantial size. Furthermore, it has been found that the ingredients of the compound tend to separate, this being prevalent in compounds containing a high bulk factor. The billet invariably is denser in some sections than in another, resulting in a cross section which is not homogenous. Due to these deficiencies in the finished product, the billet is structurally weak, ablates unevenly and therefore is not suitable for the task to be performed. These difficulties have been recognized for some time, and various suggestions have been made to improve the product. Included among these suggestions are the ideas of venting the mold and evacuation while the mold is being filled with the mold material. These ideas have improved the finished product; however, such prior art structures still do not meet existing requirements.

The present invention provides a method which will produce a homogenous, stress-free, crack-free product having strength properties heretofore unequalled in a billet formed by compression-molding a thermosetting material. Furthermore, these desirable properties are obtainable without regard to the size of the billet molded within the limit of existing mold apparatus.

It is, therefore, an object of this invention to provide a method of compression-molding thermosetting compounds wherein the finished product has improved strength characteristics.

Another object of this invention is to provide a method for compression molding thermosetting material wherein volatiles formed during cure of the mold are continuously and effectively removed.

Still another object of this invention is to provide method for compression molding a thermosetting compound wherein a vacuum is continuously drawn through the thermosetting compound to prevent air and volatiles from being trapped within the material.

Yet another object of the invention is to provide a method for compression molding a thermosetting compound wherein at least portions of the compound are separated from the mold cavity walls by a volatile sink which facilitate release of volatiles but contains the molding material.

A further object of the invention is to provide a method for compression molding of thermosetting material wherein the mold closure is controlled to regulate the density of the finished product.

Another object of this invention is to provide method for molding a thermosetting compound wherein billets of sizes from small to large can be molded having the same homogenous uniform cross section.

These and other objects and advantages of the invention will become more apparent upon reading the specification in conjunction with the accompanying drawings.

Figure 2:
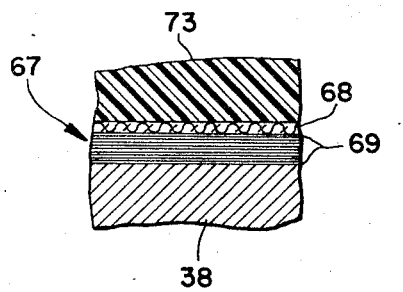

In the drawings:

FIG. 1 is a view of the apparatus for compression molding a thermosetting compound, portions of which are shown in cross section; and FIG. 2 is a cross sectional view of a volatile sink taken along the section lines II—II of FIG. 1.

Basically, this invention relates to a method and apparatus for molding a thermosetting compound. The apparatus includes a piston and cylinder arrangement with apparatus for moving one of the members to apply pressure to thermosetting material positioned within the mold chamber consisting of the enclosure formed by the inner engagement of the piston and cylinder. The thermosetting compound is separated from at least portions of the mold chamber by a volatile sink made up of a layer of ceramic paper and layers of glass cloth. The mold chamber is sealed in a manner such that apparatus for drawing a vacuum thereon is effective as long as the piston and cylinder arrangement are in engagement. Means is providde for heating the mold chamber to accomplish the thermosetting aspect. Stops are provided to limit mold closure and maintain closure within limits.

Generally, the method consists of continuously drawing a vacuum through the thermosetting compound during the duration of cure. This vacuum is also drawn through the volatile sink which allows escape of the volatiles generated within the thermosetting compound; however, the volatile sink retains other constituents of the thermosetting compound.

Referring now more specifically to the details of the invention, FIG. 1 shows the compression molding apparatus designated generally by the reference numeral 10.

The mold apparatus 10 includes a fixed header 12 to which is secured a heater platen 14. A series of steam coils 15 are located within the platen 14, the steam coils being connected to a steam line 16 adapted to communicate with a steam supply (not shown).

A piston 18 is centrally located on the header platen combination and securely fixed to the platen 14. The piston 18 is cylindrical in shape and of substantial length to allow for various quantities of material to be placed in the mold chamber, to be described more fully hereinafter. The end of the piston opposite its connection with the platen 14 is closed to provide a surface against which the thermosettting compound may be compressed.

Located opposite the piston 18 is a carriage 24 to which is secured a heater platen 26. The platen 26 is provided with steam coils 27 dispersed therethrough its area, the steam coils being connected to a steam line 28 which is in turn connected to a steam source of conventional design (not shown).

An actuator 50 is located below the carriage 24 and connected therewith by an actuator post 51. The actuator 50 may be hydraulic, pneumatic, or energized in some other conventional manner. The actuator 50 must have sufficient freedom of movement to allow the cylinder 32 to separate completely from the piston 18 to enable loading of the mold chamber with the thermosetting compound or other material to be molded.

A mold cylinder 32 is carried by the carriage and platen combination and is adapted to surround the piston 18 or a portion thereof during the molding process. The cylinder 32 has a wall 33. The cylinder wall 33 has a cavity 34 which surrounds the piston and is adapted to receive steam for heating the apparatus and therefore the thermosetting compound. An upper vacuum passage 36 is formed in the cylinder wall 33 adjacent its open end and throughout the circumference thereof. A lower vacuum passage 37 is formed in the opposite end of the cylinder wall 33 and in the cylinder bed 38 which closes the one end of the cylinder. The lower vacuum passage 37 is also of circumferential design. The cylinder bed 38 is fixed to the heater platen 26 in a conventional manner such as by bolts or welding. An upper O-ring seal or other seal 40 is located at the open end of the cylinder 33. It also extends about the interior of the cylinder wall and is adapted to engage the piston 18 when the piston and cylinder are in engagement. As is apparent from FIG. 1, the upper O-ring seal 40 is located above the upper vacuum passage 36, such that a seal is provided as long as the piston and cylinder are in engagement. A lower O-ring seal 41 is provided at the opposite end of the cylinder wall and engages the cylinder bed 38 to seal the lower end of the cylinder. It should be understood, that it is within the broadest aspect of the invention to form the cylinder wall 33 and cylinder bed 38 as an integral unit thereby eliminating the necessity of the seal 41. From the above description, it is believed clear that a mold chamber is formed by the end of the piston 18, the interior of the cylinder wall 33 and the cylinder bed 38. Sufficient clearance is maintained between the piston 18 and the cylinder wall 13 so as to allow sliding movement between the members without undue friction, and also sufficient clearance to gradually allow evacuation of the mold chamber to be accomplished along the walls of the piston and cylinder.

Stops 45 are mounted on the carriage 25 as clearly shown in FIG. 1. Two or more of the stops 45 may be utilized as the particular design might require. The stops include a hollow sleeve 46 in which is slidably disposed a telescoping rod 47. A clamp 48 is associated with the sleeve 46 and is adapted to engage the telescoping rod 47 to lock the rod in a desired position. The clamp 48 may be a bolt threaded through the sleeve to engage the telescoping rod, a pin passed through apertures formed in the sleeve and rod or other connectional clamping arrangements.

Vacuum apparatus, designated generally by the reference numeral 54, is connected to the compression molding apparatus 10 by vacuum lines 55. The vacuum lines 55 are connected directly to the upper and lower vacuum passages 36 and 37, and to a vacuum filter 56. The vacuum filter 56 is in turn connected to a vacuum pump 59 through a conduit 57 and an intermediate cutoff valve 58. A branch line 60 bypasses the cutoff valve 58 and is provided with a pressure gage 61 and valve 62. Although a particular vacuum system has been described, it is to be understood that other commercially available vacuum systems may be utilized and considered within the scope of the invention.

The mold compound or thermosetting material 73 is located within the mold chamber. This material is, however, separated from the end of head of piston 18 and the cylinder bed 38 by a volatile sink 65 and 67 respectively. Since each of these sinks are similar in construction, only the volatile sink 67 will be explained in detail.

FIG. 2 shows an enlarged view of the volatile sink 67 which consists of a layer of ceramic paper 68 and layers of glass cloth 69. Normally, only one layer of the ceramic paper is utilized; however, the number of glass cloth layers varies with the thickness of the finished part to be molded. In molding various parts, it has been found that a 13-mil, 10-ounce-square-weave glass cloth and 0.080-inch-thick ceramic paper worked well; however, it is to be understood that other sizes and weights may be used within the scope of the invention. A rule of thumb formula is that one layer of glass cloth is utilized for each ½ inch of the contemplated finished part, but generally no fewer than three layers per sink. These layers of material are cut so that they completely cover the piston head and cylinder bed, and abut the interior surface of cylinder wall 33. The volatile sink has a certain amount of porosity so as to allow the escape of air trapped in the thermosetting material and also the escape of volatiles generated during the curing process. Although gases may escape from the chamber, the volatile sink is so designed that the thermosetting material, which may be of micro-particle size, is retained within the mold chamber even though vacuum is drawn. The volatile sink also retains the thermosetting material during heating, pressing, curing and evacuation when it has a high viscosity or heavy plastic state.

Method and Operation

As an example, the thermosetting compound utilized may include a pulverized, thermoplastic nylon, which operates as a filler. This material may constitute as much as 47 percent by weight or more of the thermosetting compound. Also included is a powdered phenolic resin which may be 23 percent or more by weight of the compound. Microsized hollow phenolic spheres in the amount of 25 percent, and microsized ceramic balls may also be utilized as fillers. Although this compound has been found to provide excellent properties for an ablation material, it is to be understood that other ingredients may be utilized in various amounts and be considered within the scope of the invention. For instance, a powdered thermoplastic Teflon might be utilized in lieu of nylon.

The molding apparatus is loaded with the thermosetting material by separating the cylinder 32 from the piston 18 by means of the actuator 50. However, prior to pouring the thermosetting material into the cylinder 32, the volatile sink 67 is placed over the cylinder bed 38. After the material has been loaded into the mold chamber, it is leveled off and the volatile sink 65 placed over the thermosetting material. The piston and cylinder are then reengaged by the actuator 50. The mold is closed until a small pressure is placed on the thermosetting material.

The mold chamber is then evacuated. It is important to evacuate the mold chamber at a rate slow enough to prevent bubbling. Bubbling occurs when the pressure reduction rate within the cavity overtakes by too great a margin the inherently slow bleedoff of air capsulated within the bulk material. If bubbling occurs, the various constituents of the compound will separate. Obviously, this time will be proportional to the amount of thermosetting material in the mold cavity. It has been found that to prevent bubbling in a cavity size of 26 inches in depth by 24 inches in diameter filled with thermosetting material, it required a reduction rate of about six hours from ambient pressure to a vacuum of 5.0 milimeters of mercury, this being a reduction of approximately 1.26 millimeters per hour.

During this reduction, the mold temperature was maintained at 125° F. by steam applied to the heater platens 14 and 26 and to the cavity 34 of cylinder wall 33.

After the reduction is complete, the vacuum is maintained at 5.0 millimeters mercury throughout the duration of the curing process. The temperature is increased from 125° F. to 325° F. or higher depending on the temperature necessary to provide the thermosetting transactions between the ingredients. A clamping pressure is applied to the thermosetting material by the actuator 50. This pressure may vary from 25 pounds-per-square-inch of thermosetting material to 75 pounds-per-square-inch or higher depending on the facilities and apparatus available. Since it is difficult to maintain the actuator or ram pressure at 25 pounds-per-square-inch, the stops 45 were devised which are adjustable to maintain the various pressures desired by lengthening or shortening the telescoping rods 47.

Curing time is, of course, dependent upon the amount of thermosetting material involved. Again, as a rule of thumb, it has been found that approximately one hour of cure is needed for approximately one inch of finished part thickness. It is also believed apparent, that the density of the finished product or billet may be controlled by the ram pressure applied. Thus, for a low-density billet a small clamping pressure would be utilized whereas for a high-density billet, a high pressure would be utilized. A formula for controlling density is to determine the volume of the desired part in cubic feet, multiply this by the desired density in pounds-per-cubic-foot, and adding to this the expected weight loss from resin volatiles which will give the approximate weight of bulk material required for the molding.

After curing is complete, the billet is ejected from the mold. This may be done while the billet is still hot or after it has cooled. Usually, ejection is easier after it has cooled. The fact that the cylinder wall 33 may be separated from the cylinder bed facilitates removal of the billet.

It should be understood that during the curing process the mold chamber is completely sealed by the seals 40 and 41. Therefore, a continuous vacuum is drawn on the mold cavity. Furthermore, a vacuum is actually drawn through the thermosetting material during the curing process taking with it the volatiles generated by the heat and pressure applied to the thermosetting material. The volatile sinks 65 and 67 allow escape of the volatiles; however, contains the resin necessary for the thermosetting process. Also, the volatile sink operates as a structural support to prevent rupture or bleed-through of the thermosetting material at the areas where the vacuum passages connect with the volatile sink. It should also be apparent that the vacuum passages must also be designed so that the entire vacuum is not pulled at one point which might result in a breakdown of the volatile sink structure.

Although the volatile sink is shown positioned at the head of the piston and over the cylinder bed, it is to be understood that it might be otherwise arranged depending upon the shape of the mold chamber. Thus, the volatile sink could be placed at various positions, but should always be located such that the passages utilized for evacuating the mold cavity are covered. Along similar lines, it should be recognized that the vacuum passages might be placed in the piston as well as in the cylinder and take other positions and designs, and still be considered within the scope of the invention. It should be apparent that the piston may be made movable rather than the cylinder, and the seals arranged to be carried by the piston and/or cylinder.

From the above description of method and apparatus for molding thermosetting compounds, it should be clear that a finished product results with superior characteristics. The finished billet is essentially stress-free and has a homogenous cross section throughout. Cracks found particularly in thick billets are eliminated with the invention molding technique. Obviously, the strength properties are improved with a stress-free, homogenous and crack-free finished product. These physical features inherent in the finished product also provide a material which has improved ablation characteristics. One feature of a good ablation material is that it ablates uniformly. Obviously, uniform ablation cannot take place in a material that does not have a homogenous texture.

The apparatus of the invention provides structure which allows accomplishment of the method and the superior resultant product. The structure for sealing the mold chamber provides an arrangement whereby a vacuum may be continuously drawn from the mold cavity to remove air and volatiles. The volatile sink allows escape of the volatiles yet retains the resin and other materials necessary for the thermosetting reaction. The location of the vacuum passages with respect to the volatile sink provides an effective means for removing the volatiles without damage to the thermosetting compound. Furthermore, the volatile sink operates as structural support to prevent rupture of the thermosetting material during evacuation. This results in a uniform billet all parts of which are usable for any part which might be shaped from the billet. The stops provide a mold closure limit which facilitates molding low density billets. Thus, with proper adjustment of the stops a clamping pressure can be readily maintained at the level desired.

While a preferred embodiment and method of this invention has been described, it will be understood that other modifications and improvements may be made thereto. Such of these modifications and improvements as incorporate the principles of this invention are to be considered as included in the hereinafter appended claims unless these claims by their language expressly state otherwise.

What is claimed is:

1. A method for compression molding thermosetting materials comprising the steps of:
    placing thermosetting material of microparticle size having a high viscosity under heating and pressure and a high bulk factor in a compression mold chamber;
    separating at least a portion of the thermosetting material from the mold chamber with a layer of ceramic paper and layers of glass cloth which allows passage of gases and prevents passage of viscous material;
    closing the mold chamber and applying the full pressure of the apparatus to control density and form a high density billet;
    heating the mold chamber and thereby the thermosetting material;
    sealing the mold chamber; and
    continuously evacuating the mold chamber within the confines of the mold chamber seal during pressing and curing of the thermosetting material.

2. A method for compression molding thermosetting materials of microparticle size and high bulk factor comprising the steps of:
    loading a mold chamber with thermosetting material having a high viscosity under heat and pressure consisting of approximately 47% by weight of pulverized thermoplastic filler, 23% by weight of powdered phenolic resin, 25% by weight of phenolic spheres, and 5% by weight of ceramic spheres;
    heating the thermosetting material at approximately 325° F.;
    applying a clamping pressure of from 25 to 75 pounds-per-square-inch;
    maintaining the temperature and pressure for approximately an hour per inch of molded thermosetting material; and
    maintaining a continuous vacuum of approximately 5 mm. of mercury during pressing and the duration of the curing process.

3. A method for compression molding thermosetting materials of microparticle size and high bulk factor comprising the steps of:
    loading a mold chamber with thermosetting material having a high viscosity under heat and pressure consisting of approximately 47% by weight of pulverized thermoplastic filler, 23% by weight of powdered phenolic resin, 25% by weight of phenolic spheres, and 5% by weight of ceramic spheres;
    separating the ends of the mold chamber from the thermosetting material with a layer of ceramic paper and a layer of glass cloth for each one-half-inch of thickness of finished part which allows gases to pass and prevents passage of viscous material;
    sealing the mold chamber;
    evacuating the chamber within the confines of the seal from ambient pressure to a vacuum of 5 mm. of mercury at a temperature of 125° F.;
    thereafter increasing the temperature to 325° F.;
    applying a clamping pressure of from 25 pounds-persquare-inch to 75 pounds-per-square-inch on the thermosetting material; and maintaining continuously the last mentioned temperature, pressure and vacuum for not less than one hour-per-inch of thickness of finished part.

References Cited by the Examiner

UNITED STATES PATENTS

| | | | |
|---|---|---|---|
| 1,588,600 | 6/1926 | McCarthy | 264—316 |
| 1,972,440 | 9/1934 | Evans. | |
| 2,026,940 | 1/1936 | Hendryx | 264—102 |
| 2,434,780 | 1/1948 | Wiss et al. | 264—101 |
| 2,447,415 | 4/1948 | Lyon | 264—102 |
| 2,489,322 | 11/1949 | Olsen et al. | |
| 2,573,141 | 10/1951 | Heinrich. | |
| 2,763,028 | 9/1956 | Blake. | |
| 2,860,961 | 11/1958 | Gregor et al. | 264—331 X |
| 2,900,664 | 8/1959 | Hampel et al. | |
| 3,008,235 | 11/1961 | Roger et al. | |
| 3,027,597 | 4/1962 | McCurdy. | |
| 3,029,473 | 4/1962 | Greenberg | 264—101 |
| 3,060,517 | 10/1962 | Fields | 264—86 |

ALEXANDER H. BRODMERKEL, *Primary Examiner.*

J. H. WOO, *Assistant Examiner.*